INVENTORS
Antonio Pacciarini
& Dario Giletta

BY Stevens, Davis, Miller & Mosher
ATTORNEYS

Jan. 5, 1971    A. PACCIARINI ET AL    3,553,309
METHOD FOR PRODUCING THE TREAD BAND OF FLEXIBLE TREAD
RINGS WHILE IN A PLASTIC STATE
Original Filed June 2, 1964    4 Sheets-Sheet 4

INVENTORS
Antonio Pacciarini
& Dario Giletta

Stevens, Davis, Miller & Mosher
ATTORNEYS

United States Patent Office 3,553,309
Patented Jan. 5, 1971

3,553,309
METHOD FOR PRODUCING THE TREAD BAND OF FLEXIBLE TREAD RINGS WHILE IN A PLASTIC STATE
Antonio Pacciarini and Dario Giletta, Milan, Italy, assignors to Pirelli S.p.A., Milan, Italy
Original application June 2, 1964, Ser. No. 371,898, now Patent No. 3,358,330, dated Dec. 19, 1967. Divided and this application Oct. 9, 1967, Ser. No. 673,823
Claims priority, application Italy, July 27, 1963, 15,741/63, Patent 702,344
Int. Cl. B29h 5/02
U.S. Cl. 264—313       12 Claims

ABSTRACT OF THE DISCLOSURE

A method of producing an embossed pattern along the peripheral band of a flexible ring in a plastic state, wherein the inner surface of the flexible ring is initially engaged by a collapsible inner ring after which the outer surface of the flexible ring is engaged by a plurality of sectors forming an outer mold and having radial projections on their inner surfaces corresponding to the pattern.

CROSS-REFERENCES TO RELATED APPLICATIONS

This application is a division of applicants' U.S. patent application Ser. No. 371,898 filed June 2, 1964, now Pat. No. 3,358,330.

BACKGROUND OF THE INVENTION

(1) Field of the invention

The present invention relates to a method for printing an embossed pattern along the peripheral band of one or more flexible rings in a plastic state and for the possible heat treatment of said rings, and more particularly relates to the manufacture and the retreading of separable tread rings for pneumatic tires which tread rings are provided with annular reinforcing structures.

(2) Prior art

As is known to those skilled in the art, in order to mold or vulcanize tread rings separately from the carcasses onto which they are ultimately applied, a ring of uncured rubber was prepared which has a width about equal to the width of the tread to be obtained. Then, the ring was inserted on a core in the form of a rigid, continuous ring of a circular cross section having an annular inner chamber for the circulation of a heated fluid. Next, the pattern was printed on the peripheral band of the rubber ring by means of a mold comprising circular sectors manually positioned around the ring to be treated and then pressed against its outer surface by means of a frusto-conical hollow body, also provided with a chamber for the circulation of a heating fluid, which was caused to slide along the frusto-conical outer surface of the mold by means of a piston. A heated fluid was then injected into the chamber of the core as well as that of the frusto-conical hollow body to cure the ring. Both the inner rigid core and the sectors of the mold were constantly maintained on the same plane.

In the method described above, the insertion of the ring on the core gave rise to difficulties and consumed much time, both because the operator had to exert traction on the ring to bring its inner diameter to a value greater than that of the outer diameter of the core, and because the rubber, by coming into contact with the outer surface of the core while still very hot from the prior vulcanization step tended to adhere to said surface, thus affecting the insertion of the ring on the core. What is more, the operator was likely to be burned by contact with the mold sectors during the manual positioning step and by contact with the core during the insertion and the removal of the ring to be treated.

Moreover, the prior method would not permit the treatment of rings having an inextensible reinforcing structure, since such rings, even temporarily, are unable to assume a diameter greater than the building up diameter of the carrying carcass.

SUMMARY OF THE PRESENT INVENTION

A primary object of the present invention is to provide a new method of printing an embossed pattern along the peripheral band, while in a plastic state, of one or more flexible rings disposed side by side and connected to one another.

Briefly summarized, the method of the present invention includes the initial step of imparting a circular shape to the ring to be treated by maintaining its development constant and keeping its inner face in contact with a rigid, continuous cylindrical member of circular cross section, having an outer diameter corresponding to the inner diameter of the ring and divisible in at least two parts. Then, the flexible ring is compressed radially from the outside to the inside with at least two rigid arcuate members each provided on the surface adjacent the ring with radial projections corresponding to the cavities to be produced on the outer surface of the ring. To cure the already molded ring, the mold is surrounded with a heated fluid under high pressure.

The method forming the object of the present invention has considerable advantages with respect to the one heretofore followed. In fact, by adopting a collapsible core, it is possible to assemble around it rings having a correct development without the necessity of deforming them and of increasing their diameter. The importance of this detail appears more evident when it is considered that the rings of uncured rubber are in the plastic state and therefore their deformation is permanent.

A further advantage is represented by the possibility of treating rings in which substantially inextensible annular reinforcing structures are embedded.

Moreover, according to the method of the present invention, both the insertion of the ring to be treated and its removal after the treatment may be carried out in an expeditious manner without any danger to the operator.

Furthermore, the fact that the centripetal approach of the mold sectors is mechanical and is carried out in a more regular manner than is allowed by a manual operation has a favorable influence on the accuracy of the printed pattern and therefore of the finished ring.

BRIEF DESCRIPTION OF THE DRAWINGS

These and other features and advantages of the present invention will appear more clearly from the following description of a preferred embodiment of the invention, made with reference to the accompanying drawings, in which.

DESCRIPTION OF THE PREFERRED EMBODIMENTS

Figure 1:
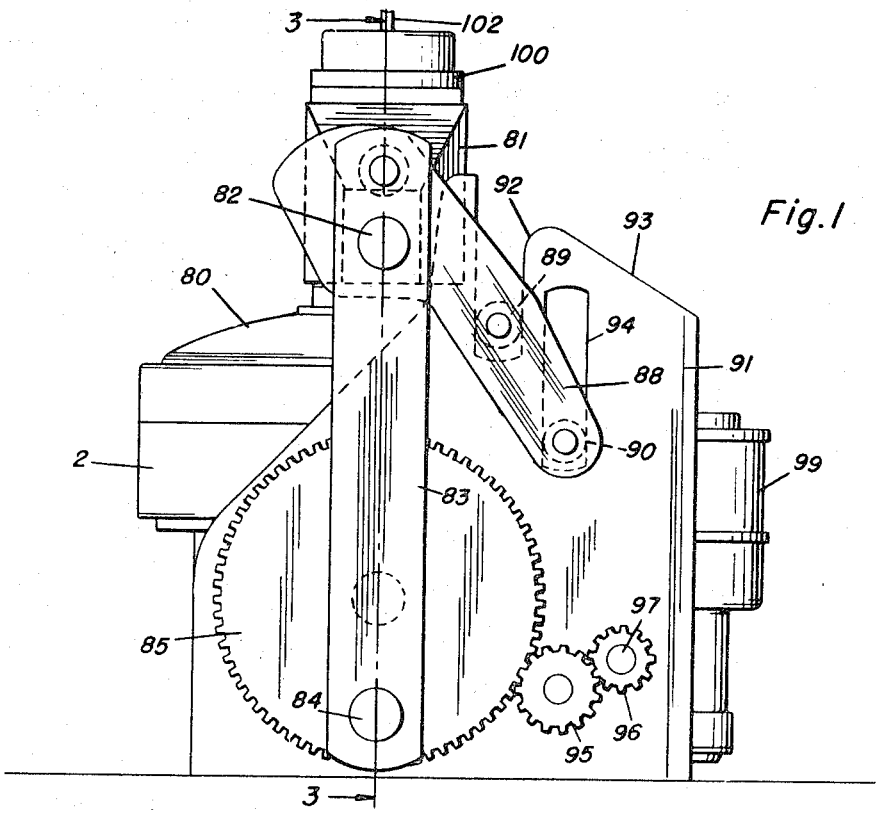
FIG. 1 is an end elevational view of the curing unit for pneumatic tire tread rings utilized in carrying out the method of the present invention.

The curing unit illustrated by the drawings embodies a frame 1 bearing a generally cylindrical container 2 which is provided on the rear wall thereof with an opening 3 for the introduction and the discharge of compressed fluid necessary for curing the ring, and on its bottom with a central hole, through which a cylinder 4 extends downwardly. In the cylinder 4 there are slidably mounted a piston 5 with its corresponding hollow stem 6 and a piston 7 with its corresponding hollow stem 8. Hollow stem 8, through the piston 5, passes inside the hollow stem 6. Integral with the lower end of the cylinder 4, and inside the hollow stem 8, there is assembled a tube 9, the lower end of which is connected, through a port 10, to a source of water under pressure. The lower end of the cylinder 4 is also provided with a second port 11 for the injection and the discharge of water under pressure below the piston 7. Disposed adjacent the lower end of the stem 8 there is a port 12, which communicates the interspace existing between the tube 9 and the stem 8 with the space existing between the pistons 5 and 7.

The upper end of the cylinder 4 carries a circular plate 13, which supports a mold constituted by a plurality of circular sectors 14. Each of these sectors, on its inner surface, is provided with protuberances corresponding to the cavities to be produced on the flexible ring 15 and is assembled on a support 16, provided with two lateral guides 17 and having an inclined plane 18 positioned between these guides. A second inclined plane 19, integral with the frame 1 through a supporting ring 20, is provided between each pair of guides 17 and disposed in operative engagement with each inclined plane 18.

The stem 6 carries at its upper end a ring 21 from which two spokes 22 and 23, intended to support a ring 24 integral therewith, project upwardly.

The ring 24 in turn supports a collapsible ring constituted by four rigid circularly arcuate segments or sectors 25, 26, 27 and 28, of equal size two by two and each being provided with an upper and a lower undercut upon its outer face.

The sectors 25 and 26 have on their inner face two pairs of ears 29–30, 31–32, in which pins 33–34, 35–36, are respectively threaded. In the central part of these pins, one end of links 37, 38, 39 and 40 is respectively pivoted. The opposite end of links 37, 38, 39 and 40 is respectively pivoted on the pins 41, 42, 43 and 44 which are threaded in the block 45, supported by an annular ledge 46 provided outside the stem 8.

The segments 27 and 28 of the collapsible ring, supported by the ring 24, have on their inner face eight pairs of ears, disposed four by four in two different horizontal planes. In the upper plane are disposed pairs of ears 47, 48, 49 and 50, and in the lower plane lie pairs of ears 51 and 52 (and two other pairs which do not appear from the figures, but which are parallel to those of the upper plane). In the pairs of ears 47 and 48 there is threaded a pin 53, into which is pivoted an I-shaped element 54, pivoted at its opposite end in a pin 55 threaded in block 45. In the pairs of ears 49 and 50 there is threaded a pin 56, into which is pivoted an I-shaped element 57, pivoted at its opposite end in a pin 58 threaded in the block 45.

Similarly, in a plane lower than that of the pairs of ears 47, 48, 49 and 50, at the ends of pins 59 and 60, 61 and 62 are respectively pivoted links 63 and 64 (and two other links which do not appear in the figures).

On the bottom of the cylinder 4 there are slidably assembled two shoes 65 and 66 passed through by a pin 67 upon which is pivoted the end of a lever 68. The opposite end of lever 68 is keyed on a shaft 69 rotatably assembled in the frame 1.

At the opposite sides of the lever 68 and symmetrically with respect to it, on the frame 1, there are pivoted two cylinders 70 and 71 into which slide two pistons, the stems 72 and 73 of which are each pivoted at one end of the corresponding levers 74, while the opposite ends of the levers 74 are keyed on the shaft 69.

In the central part of shaft 69 there is keyed a lever 75 which, at its upper end, carries a screw 76. Screw 76 during the introduction of the ring 15 in the curing unit, is in contact with the stem 77, connected to the piston slidable in single-acting cylinder 78, which is provided with an opening 79 for the introduction and the discharge of compressed fluid.

The lid 80 of the container 2 is fastened to the lower part of a longitudinal beam 81 provided at opposite ends with a pin 82, supported in the upper end of a lever 83 pivotally connected at its opposite end to a pin 84 integral with a gear wheel 85 assembled in the supports 86 and 87 of the frame 1. On the opposed sides of the beam 81 there are fastened plates 88 into which are rotatably assembled rollers 89 and 90. And, on opposite sides of the frame 1 there are fastened, integral with it, two upright plates 91. Each of the latter plates is provided with a vertical guide 92 and an inclined guide 93, to permit sliding of the rollers 89, as well as a second vertical guide 94 to permit sliding of the rollers 90.

The gear wheels 85 are actuated in both directions, through the gears 95, which mesh with the pinions 96 keyed on the shaft 97 of the motor-speed reducer 98, by the reversing motor 99.

At the top of the beam 81 there is secured a cylinder 100, in which there is slidably assembled a piston 101. The top wall of the cylinder 100 is provided with a port 102 for the introduction and the discharge of compressed fluid. The stem 103 of a piston 101 carries at its lower end a hollow generally circular member 104, on the outer surface of which there is screwed a plate 105 which in turn is provided on its lower surface with plates 106, disposed along a circumference, engageable with the sectors 14 and the supports 16 of the mold. Plate 105 is further provided with an adjusting ring 107, which engages on the inner surface of the collapsible ring to prevent any collapsing caused by the tendency of the tread ring to expand in consequence of the increase of temperature during the vulcanized operation. A corresponding adjusting ring 108 is provided integral with the circular plate 13.

In order to mold and vulcanize a tread ring, when the curing unit is loaded and completely closed, the lid 80 is raised by actuating a conventional source of power such as motor 99 which, through a motor-speed reducer and the gears 95 and 96, rotates gear wheels 85 so as to bring the pins or wheels 84 in a position corresponding to top dead center.

By virtue of the rotation of the wheels 84, the crank mechanism constituted by the levers 83 and the beam 81 initially raises the lid 80, maintaining it in a state of parallelism, and then rotates it about the pins 82 to an angle less than 90°. These movements are caused by means of the rollers 89 and 90, which slide in the guides 92, 93 and 94.

The raising of the lid 80 releases the pressure on the sectors 14 and on the collapsible mold 25, 26, 27 and 28, so that the cylinder 4 is pushed upwardly by the pistons contained in the cylinders 70 and 71, which are connected with the source of compressed fluid.

Figure 2:
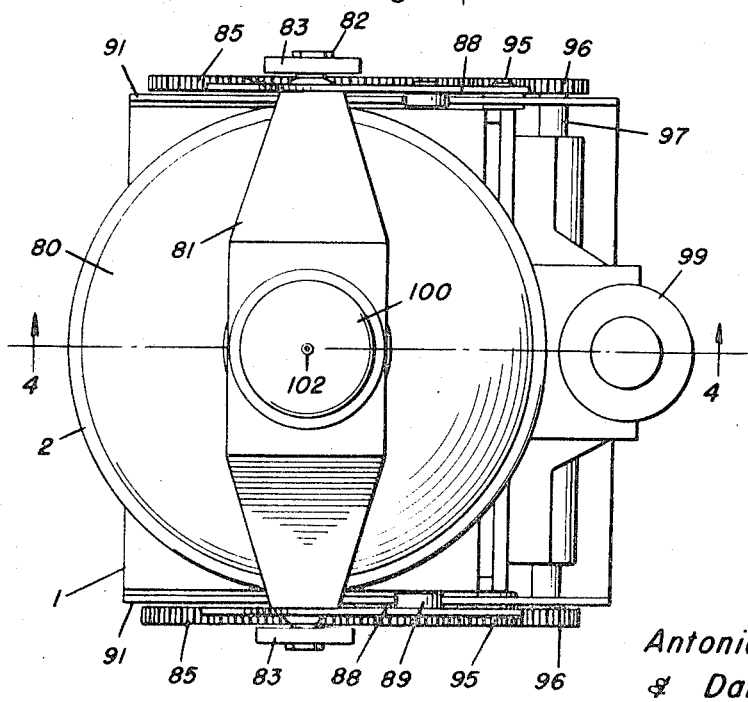
FIG. 2 is a top plan view of the curing unit shown in FIG. 1.
Figure 3:
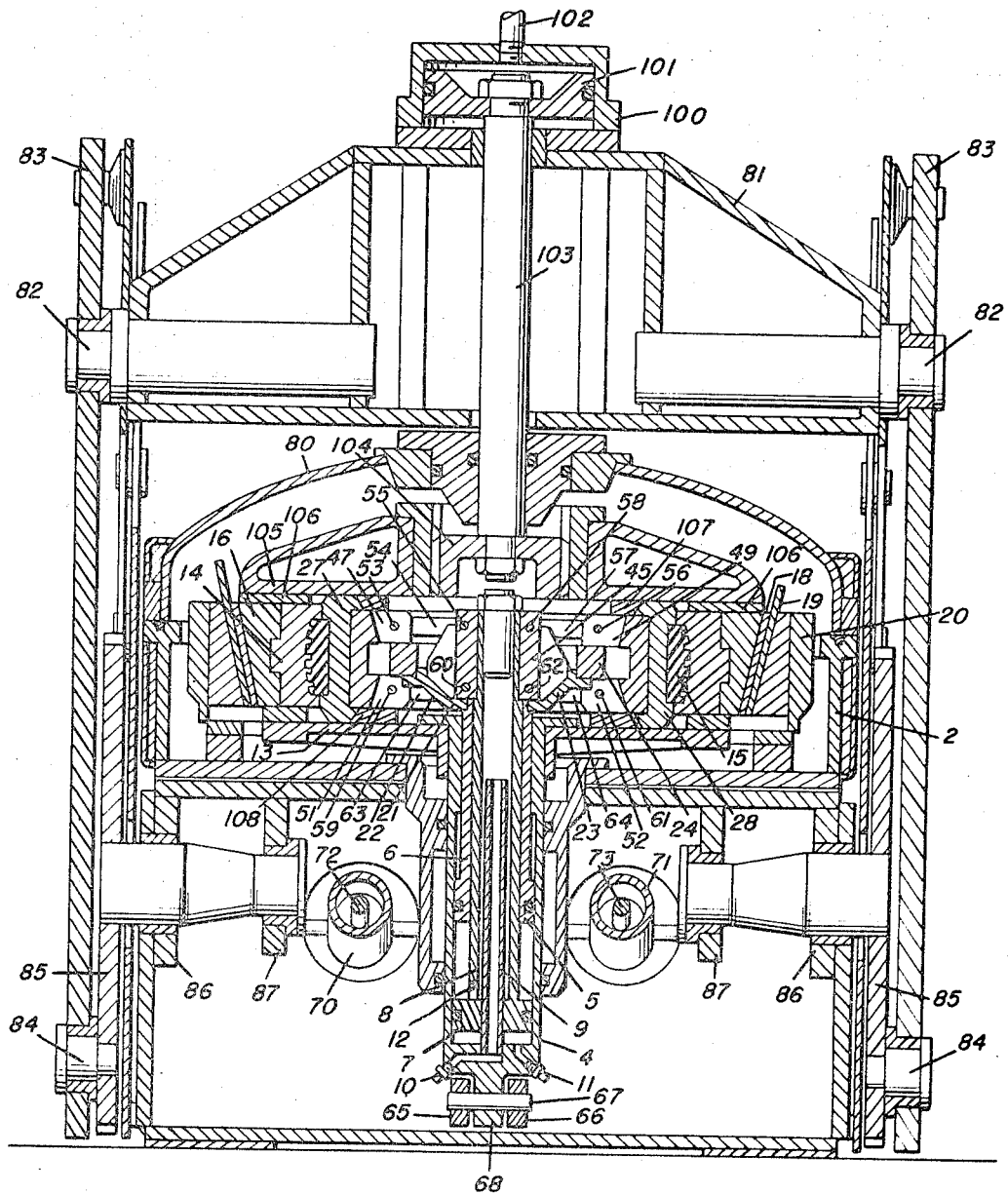
FIG. 3 is a longitudinal sectional view of the curing unit shown in FIG. 1.
Figure 4:
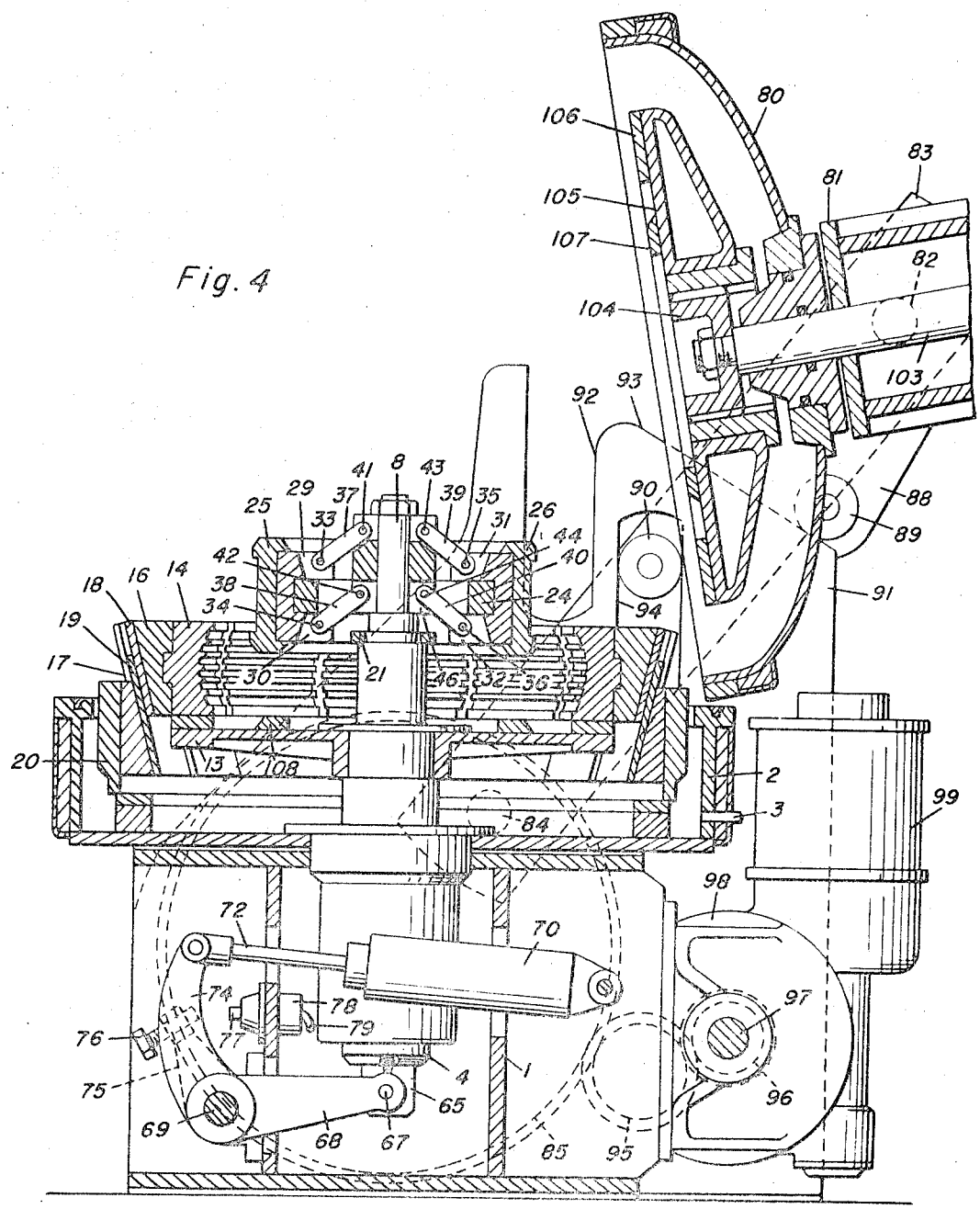
FIG. 4 is a cross section of the curing unit in open positions taken on line 4—4 of FIG. 2.
Figure 5:
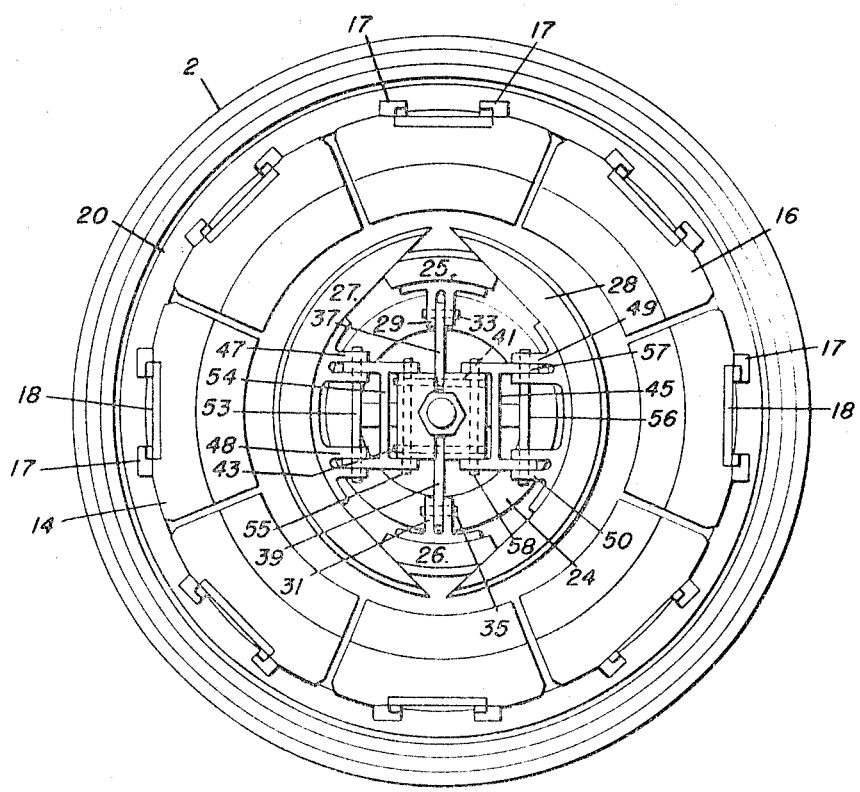
FIG. 5 is a top plan view of the curing unit with parts removed for illustrative purposes and showing the molding mechanism in one operative position.
Figure 6:
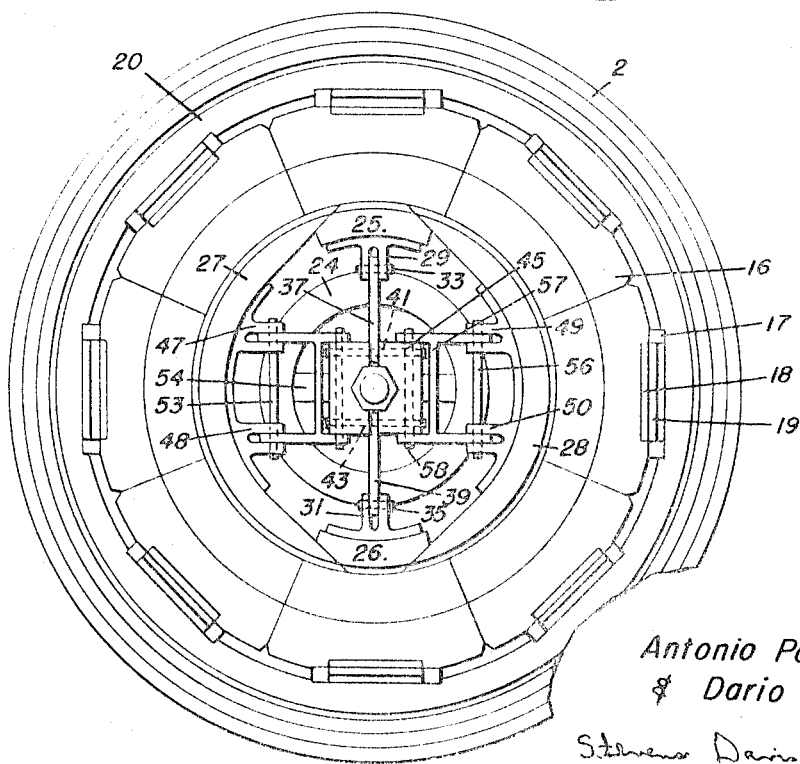
FIG. 6 is also a top plan view thereof with the molding mechanism in another operative position.

As best shown in FIG. 2, the raising of the cylinder 4 causes upward displacement of the circular plate 13, as well as outward radial movement of the mold sectors 14 and, consequently, their mutual detachment.

When the curing unit is completely opened, water under pressure is injected under the piston 7 through the opening 11, and at the same time the port 10 is closed so that the water existing between the two pistons 5 and 7 may not flow therein. The water injected through the opening 11 pushes up the pistons 7 and 5 until the latter completes its stroke. At this moment the port 10 is opened so that the water existing between the pistons 5 and 7 may be discharged, through the port 12, the tube 9 and the port 10, and the piston 7 may come into contact with the lower surface of the piston 5. Then, port 10 is closed. The approach of the piston 7 to the piston 5 operates the lifting of the block 45 and of the pins 41, 42, 43, 44 and 55, 58, 62 and 60 threaded into it. As a result the segments 25, 26, 27 and 28 are subjected to a centripetal displacement and the ring formed by them is caused to contract. Simultaneously, the vulcanized tread ring 15 is freed from the undercuts of the collapsible ring into which it was inserted and is removed from the curing unit.

In order to load a new ring, compressed fluid is injected into the cylinder 78, in order to push the stem 77 outwardly, and the cylinders 70 and 71 are discharged. The cylinder 4, the plate 13 and the elements supported by it are then displaced downwardly by gravity, thus causing the lever 75 to rotate about the shaft 69 until the block 76 comes into contact with the stem 77. The sectors 14 are radially displaced inwardly, but do not come into contact with one another and with the segments of the collapsed ring, as the stem 77 prevents cylinder 4 from reaching its lowermost position.

The upper surface of the sectors 14 constitutes a supporting plane for the ring 15 to be vulcanized, so that the latter cannot slide downwardly before expansion of the collapsible ring occurs.

Next, the ring 15 to be vulcanized is inserted on the collapsed ring 25, 26, 27 and 28 and the latter is expanded by the introduction of water between the pistons 5 and 7 through the port 10, which is reopened, and into the tube 9 to the opening 12. Then the cylinders 70 and 71 are again reconnected to the source of compressed water in order to again lift the cylinder 4 and to mutually detach the sectors 14 so that the ring 15 may be inserted between them.

By means of the motor 100 the gear wheels 85 are actuated to swing the circular lid 80 to an angle slightly less than 90° until its lower edge is substantially horizontal, and to lower the lid by maintaining the lid in a state of parallelism until the compressed fluid is discharged from the cylinder 79.

The lowering of the lid 80 causes engagement of the adjusting ring 107 on the inner face of the segments 25, 26, 27 and 28 of the collapsible ring, as well as engagement of the plate 105 on the upper surface of said segments, thus lowering the collapsible ring together with the piston 5. The lowering of the latter continues until the collapsible ring 25, 26, 27 and 28 contacts the circular plate 13 and the adjusting ring 107 engages on the inner surface of the collapsible ring, and causes discharge of a portion of the water existing between the pistons 5 and 7 through the opening 10. The lid 80, in its progressive displacement downwardly, engages the plates 105 on the upper surface of the sectors 14 and the corresponding portions of supports 16, and pushes the circular plate 13 downwardly together with all the elements supported by it and inasmuch as the cylinder 4 is integral with plate 13, at a pressure higher than that exerted by the fluid existing below the pistons of the cylinders 70 and 71 which control the axial displacement of the cylinder 4, the fluid is caused to return in the tube from which it came. The lowering of the plate 13 causes the inclined planes 18 to slide along the stationary inclined planes 19, thus bringing about the radially inward movement of the sectors 14, whose projections penetrate in the surface of the ring 15, and completely closing the mold after discharge of the compressed fluid from the cylinder 78. At this stage the lid 80 contacts the upper edge of the container 2, closing off the mold from the room atmosphere, and the block 75 comes into contact with the cylinder 78. Then compressed fluid is introduced through the opening 102 to exert the desired pressure on the inner surface of the collapsible ring and on the upper surface of the sectors 14, while a corresponding counter-pressure is exerted by the adjusting ring 108 and by the plate 13 respectively on the lower part of the inner surface of the collapsible ring and on the lower surface of the molds by means of the cylinders 70 and 71.

Next, the tread ring 15 is vulcanized by delivering heated fluid under pressure through the opening 3. Following vulcanization, the fluid under pressure is discharged from the container 2, and the curing unit is reopened, as described above.

It will be obvious that other embodiments of the method disclosed in this application may be utilized by those skilled in the art without departing from the scope of the invention as defined in the appended claims.

We claim:

1. A method of producing an embossed pattern along the peripheral band of a flexible ring composed of a material in a plastic state in which there is embedded a substantially inextensible annular reinforcing structure, including imparting a circular shape to said ring by maintaining its development constant and by keeping the inner face of said ring in contact with a rigid and continuous inner circular surface, said surface having an outer diameter corresponding to the inner diameter of said ring and being divisible in at least two parts, and then compressing said ring radially from the outside to the inside with at least two rigid arcuate outer surfaces provided on their faces adjacent the ring with radial projections corresponding to the cavities to be obtained on the outer surface of said ring and then subjecting said ring to a heat treatment while it is positioned between said inner and outer surfaces in order to cure the plastic material thereof.

2. The method of claim 1, including the steps of mounting the flexible ring on at least two said parts of said rigid inner circular surface and causing said parts to assume a continuous circular shape simultaneously with said ring, the outer diameter of which corresponds to the inner diameter of said ring.

3. The method of claim 2, including creating a temporary supporting plane which corresponds to the position of the lower edge of the ring to be treated in order to facilitate insertion of said ring on said arcuate surfaces.

4. A method for producing an embossed pattern along the peripheral band of a flexible ring composed of a material in a plastic state in which there is embedded a substantially inextensible annular reinforcing structure, comprising the steps of radially displacing a plurality of inner rigid arcuate segments into engagement with the inner surface of said flexible ring, said segments forming a collapsible inner ring; and subsequently radially displacing a plurality of outer sectors each having radial projections on its inner surface into engagement with the outer surface of said flexible ring, said outer sectors forming an outer mold; the initial engagement of said flexible ring by said inner rigid arcuate segments being in a different plane than the initial engagement of said flexible ring by said outer sectors and then subjecting said ring to a heat treatment while it is positioned between said inner segments and outer sectors in order to cure the plastic material thereof.

5. The method of claim 4, wherein said inner rigid arcuate segments are displaced simultaneously.

6. The method of claim 4, wherein said inner rigid arcuate segments are radially displaced in the same plane.

7. The method of claim 4, wherein said outer sectors are displaced simultaneously.

8. The method of claim 4, further comprising the step of forming a temporary support for said flexible ring during the initial engagement thereof by said inner rigid arcuate segments.

9. The method of claim 8, wherein said temporary support is formed by said outer sectors before they engage said flexible ring.

10. The method of claim 8, including displacing said outer sectors radially outwardly and then displacing said inner rigid arcuate segments radially inwardly and removing the treated flexible ring from its position of contact with said collapsible ring and said mold, after said step of heat treating.

11. A method for producing an embossed pattern along the peripheral band of a flexible ring composed of a material in a plastic state in which there is embedded a substantially inextensible annular reinforcing structure, comprising the steps of forming a temporary support for said flexible ring; simultaneously radially displacing a plurality of inner rigid arcuate segments in the same plane into engagement with the inner surface of said flexible ring, said segments forming a collapsible inner ring; and subsequently radially displacing a plurality of outer sectors each having radial projections on its inner surface into engagement with the outer surface of said flexible ring, said sectors forming an outer mold and then subjecting said ring to a heat treatment while it is positioned between said inner segments and outer sectors in order to cure the plastic material thereof.

12. The method of claim 11, wherein the initial engagement of said flexible ring by said inner rigid arcuate segments is in a different plane than the initial engagement of said flexible ring by said outer sectors.

References Cited

UNITED STATES PATENTS

| | | | |
|---|---|---|---|
| 1,174,885 | 3/1916 | Macbeth | 264—326 |
| 2,978,749 | 4/1961 | Del Mar | 18—17(W) |
| 3,012,277 | 12/1961 | Soderquist | 18—17(W) |
| 3,053,400 | 9/1962 | Erickson et al. | 18—17(W)X |
| 3,131,243 | 4/1964 | Fannen | 264—326X |
| 3,134,136 | 5/1964 | Soderquist | 18—2(TP) |

FOREIGN PATENTS

| | | | |
|---|---|---|---|
| 1,249,870 | 11/1960 | France | 264—326 |

ROBERT F. WHITE, Primary Examiner

J. H. SILBAUGH, Assistant Examiner

U.S. Cl. X.R.

264—326